F. WYLLYS.
TIRE PROTECTOR.
APPLICATION FILED OCT. 24, 1912.
1,094,827.
Patented Apr. 28, 1914.
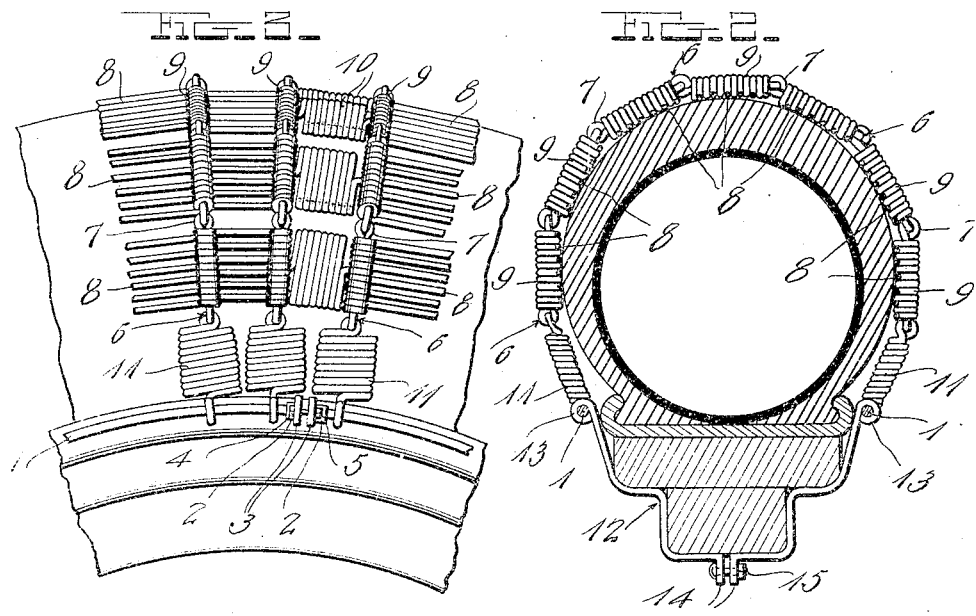
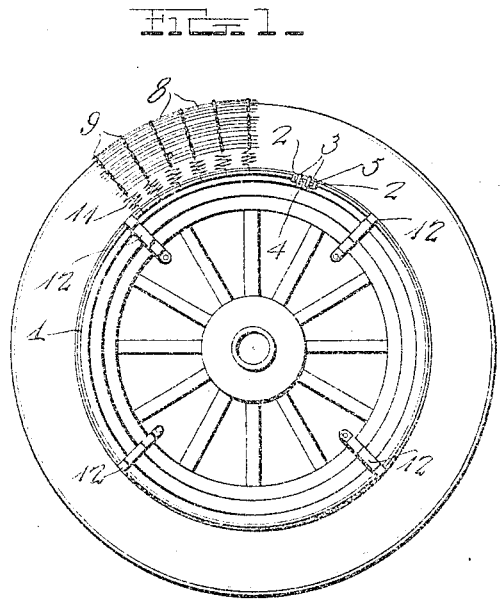
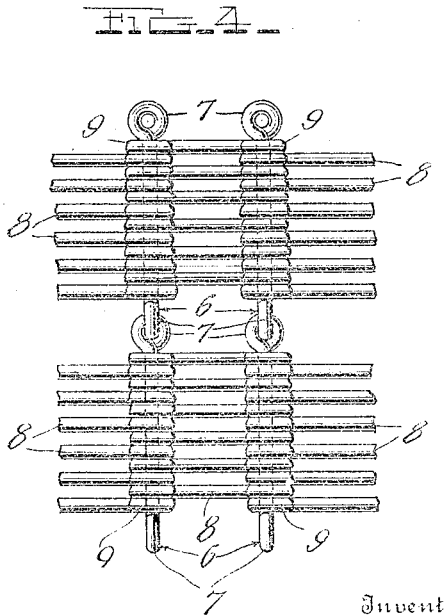
Witnesses
J. R. Pierce
C. E. Hunt
Inventor
Frank Wyllys
By H. B. Willson & Co.
Attorneys

UNITED STATES PATENT OFFICE.

FRANK WYLLYS, OF ATLANTA, MICHIGAN, ASSIGNOR OF ONE-FOURTH TO ORWIN A. PHELPS, OF GAYLORD, MICHIGAN, AND SIX TWENTY-FIFTHS TO HERMAN LUNDEN, OF BRILEY, MICHIGAN.

TIRE-PROTECTOR.

1,094,827.  Specification of Letters Patent.  Patented Apr. 28, 1914.

Application filed October 24, 1912. Serial No. 727,583.

*To all whom it may concern:*

Be it known that I, FRANK WYLLYS, a citizen of the United States, residing at Atlanta, in the county of Montmorency and State of Michigan, have invented certain new and useful Improvements in Tire-Protectors; and I do declare the following to be a full, clear, and exact description of the invention, such as will enable others skilled in the art to which it appertains to make and use the same.

This invention relates to improvements in protectors for pneumatic tires.

One object of the invention is to provide a protector for pneumatic tires which will effectually prevent the tires from being punctured and which will positively prevent the tire from slipping or skidding.

Another object is to provide a protector which will be simple, strong, durable and inexpensive in construction, efficient and reliable in operation and which will not interfere with the resiliency or cushioning action of the tire.

With these and other objects in view, the invention consists of certain novel features of construction, and the combination and arrangement of parts as will be more fully described and claimed.

In the accompanying drawings: Figure 1 is a side view of a wheel and tire showing the application of the invention; Fig. 2 is a cross sectional view thereof; Fig. 3 is a view similar to Fig. 1 on an enlarged scale of a portion of the wheel and tire and of this improved protector; Fig. 4 is a plan view of a portion of the protector laid out flat and showing more clearly the structure thereof.

My improved tire protector comprises a pair of wire rings 1, the diameter of which corresponds substantially to the diameter of the rim of the wheel to which the protector is applied. The rings 1 are open and have their adjoining ends threaded and engaged with sockets 2 which are provided with laterally projecting apertured lugs 3. With the apertured lugs on the ends of each of the rings 1 is engaged a clamping bolt 4, said bolt having clamping nuts 5 which are adapted to be screwed up on the bolt thereby drawing the lugs 3 and sockets 2 together and thus firmly connecting the ends of the rings.

Arranged between and connected at its edges with the rings 1 is a flexible tire covering formed of a series of transversely disposed links 6 in the form of short wire rods having on their ends eyes 7 which are engaged with each other and connect the links as shown. The transverse rows of links 6 are spaced a suitable distance apart around the tire and each of the links 6 is connected by a series of longitudinally disposed links 8 which are in the form of wire rods having on their ends eyes 9 which loosely engage the links 6. The eyes 9 of the links 8 between one pair of the transverse links 6 are engaged with said links 6 between the eyes 7 thereof. The longitudinal links of one row on one side of the transverse link are spaced apart by the oppositely extending longitudinal links on the other side of said transverse link. Any number of longitudinal links 8 may be strung on each of the transverse links, twelve being here shown six of said longitudinal links extending in one direction and six in the other. It will be noted that the longitudinal links along the center of the tire are necessarily of greater length than those along the sides of the tire and that the links 8 gradually decrease in length from the center toward the edges of the protector owing to the curvature of the tire.

The two rows of transverse links 6 adjacent to the connected ends of the rings 1 are connected by a series of flat coiled springs 10 which take the place of the longitudinal links 8 between these two rows of transverse links and thus permit the protector to be stretched at this point when the clamping bolts 4 are removed, so that the protector may be readily placed over and engaged with the tire.

Connected with the eyes on the outer ends of the transverse links along the side edges of the protector are flat coiled springs 11 the outer ends of which are connected with the rings 1, said springs 11 thus serving to stretch the protector and to yieldingly hold the same in stretched position on the outer surface of the tire when applied thereto.

The protector is held in firm engagement with the tire and securely fastened to the rim of the wheel by a series of clips 12 which are in the form of sheet metal plates bent to conform to the curvature of each side of the rim of the wheel with which they are engaged, said plates having their outer ends bent to form eyes 13 which are loosely engaged with the rings 1 at suitable intervals. The inner ends of the clips or plates 12 have formed thereon right angular inwardly projecting apertured lugs 14 with which are engaged short bolts 15 whereby the clips are fastened together around the rim of the wheel as clearly shown in Fig. 3 of the drawing. Any suitable number of clips 12 and springs 11 may be provided for fastening the protector to the wheel and stretching it around the tire.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as shown.

Having thus described my invention, what I claim is:

1. A tire armor comprising an oppositely disposed pair of twin hoops adapted to form the base edges of the armor, a plurality of longitudinally spaced series of links extending transversely between said hoops and connected at opposite ends with said hoops, the links of the respective series being in the form of short rods having eyes flexibly connected, longitudinally extending links having eyes at their opposite ends strung on the links of the transverse series, whereby said transverse series of links are held in spaced relation.

2. A flexible tire armor comprising a plurality of longitudinally spaced series of transversely extending links in the form of members having eyes at their opposite ends, the eyes of one member being engaged with the eyes of adjacent members, series of longitudinally disposed similarly constructed links having their eyes strung on the body portion of the transverse links, and means for securing said armor to a tire.

3. A flexible tire armor comprising a plurality of longitudinally spaced series of transversely extending links in the form of short wire rods having eyes at their opposite ends, the eyes of one rod being engaged with the eyes of adjacent rods, series of longitudinally disposed similarly constructed links loosely engaging the transverse links, and means for securing said armor to a tire.

In testimony whereof I have hereunto set my hand in presence of two subscribing witnesses.

FRANK WYLLYS.

Witnesses:
   EDWARD CAMERON,
   HORACE COOK.